United States Patent
Bennati

(10) Patent No.: US 12,323,397 B2
(45) Date of Patent: Jun. 3, 2025

(54) METHOD AND APPARATUS FOR MANAGING USER REQUESTS RELATED TO PSEUDONYMOUS OR ANONYMOUS DATA

(71) Applicant: HERE Global B.V., Eindhoven (NL)

(72) Inventor: Stefano Bennati, Zürich (CH)

(73) Assignee: HERE Global B.V., Eindhoven (NL)

(*) Notice: Subject to any disclaimer, the term of this patent is extended or adjusted under 35 U.S.C. 154(b) by 519 days.

(21) Appl. No.: 17/543,243

(22) Filed: Dec. 6, 2021

(65) Prior Publication Data

US 2023/0179577 A1 Jun. 8, 2023

(51) Int. Cl.
*H04L 9/40* (2022.01)
*H04L 9/32* (2006.01)

(52) U.S. Cl.
CPC ........ *H04L 63/0414* (2013.01); *H04L 9/3236* (2013.01); *H04L 2209/42* (2013.01)

(58) Field of Classification Search
CPC .............. H04L 63/0414; H04L 9/3236; H04L 2209/42
USPC ........................................................ 380/255
See application file for complete search history.

(56) References Cited

U.S. PATENT DOCUMENTS

| | | | |
|---|---|---|---|
| 8,752,149 B2 | 6/2014 | Emura et al. | |
| 9,372,904 B2 | 6/2016 | Dola | |
| 10,037,689 B2 * | 7/2018 | Taylor | G05D 1/0285 |
| 10,521,839 B2 | 12/2019 | Dearing et al. | |
| 11,665,533 B1 * | 5/2023 | Balmakhtar | H04L 9/0894 |
| | | | 380/270 |
| 2007/0192139 A1 * | 8/2007 | Cookson | G16H 10/60 |
| | | | 705/3 |
| 2009/0265788 A1 * | 10/2009 | Ehrenschwender | G06F 21/6254 |
| | | | 380/282 |
| 2011/0010563 A1 | 1/2011 | Lee et al. | |
| 2015/0089647 A1 | 3/2015 | Palumbo et al. | |

(Continued)

FOREIGN PATENT DOCUMENTS

WO WO-2014075836 A1 * 5/2014 ......... G06F 21/6254

OTHER PUBLICATIONS

Office Action for related European Patent Application No. 22211125.4-1218, dated Apr. 24, 2023, 6 pages.

(Continued)

*Primary Examiner* — Tauqir Hussain
(74) *Attorney, Agent, or Firm* — DITTHAVONG, STEINER, & MLOTKOWSKI

(57) ABSTRACT

An approach is provided for managing pseudonymous or anonymous user data and relevant data management requests. The approach involves, for example, converting a numerical feature of a data point into a categorical form. The categorical form represents a value range into which a numerical value of the numerical feature falls. The approach also involves determining an identifier of a data contributor associated with the data point. The approach further involves concatenating the identifier with the categorical form. The approach further involves cryptographically hashing the identifier concatenated with the categorical form to generate a mark. The approach further involves associating the mark with the data point to generate marked pseudonymous-anonymous data. The approach further involves transmitting the pseudonymous-anonymous data to a data platform.

16 Claims, 13 Drawing Sheets

(56) References Cited

U.S. PATENT DOCUMENTS

2021/0092551 A1* 3/2021 Millington ............ H04W 4/029
2023/0064675 A1* 3/2023 Higgins ................. H04N 23/60

OTHER PUBLICATIONS

Wintergerst et al., "Protecting GDPR Personal Data with Pseudonymization", Blog, retrieved from https://www.elastic.co/blog/gdpr-personal-data-pseudonymization-part-1, Mar. 27, 2018, 6 pages.

* cited by examiner

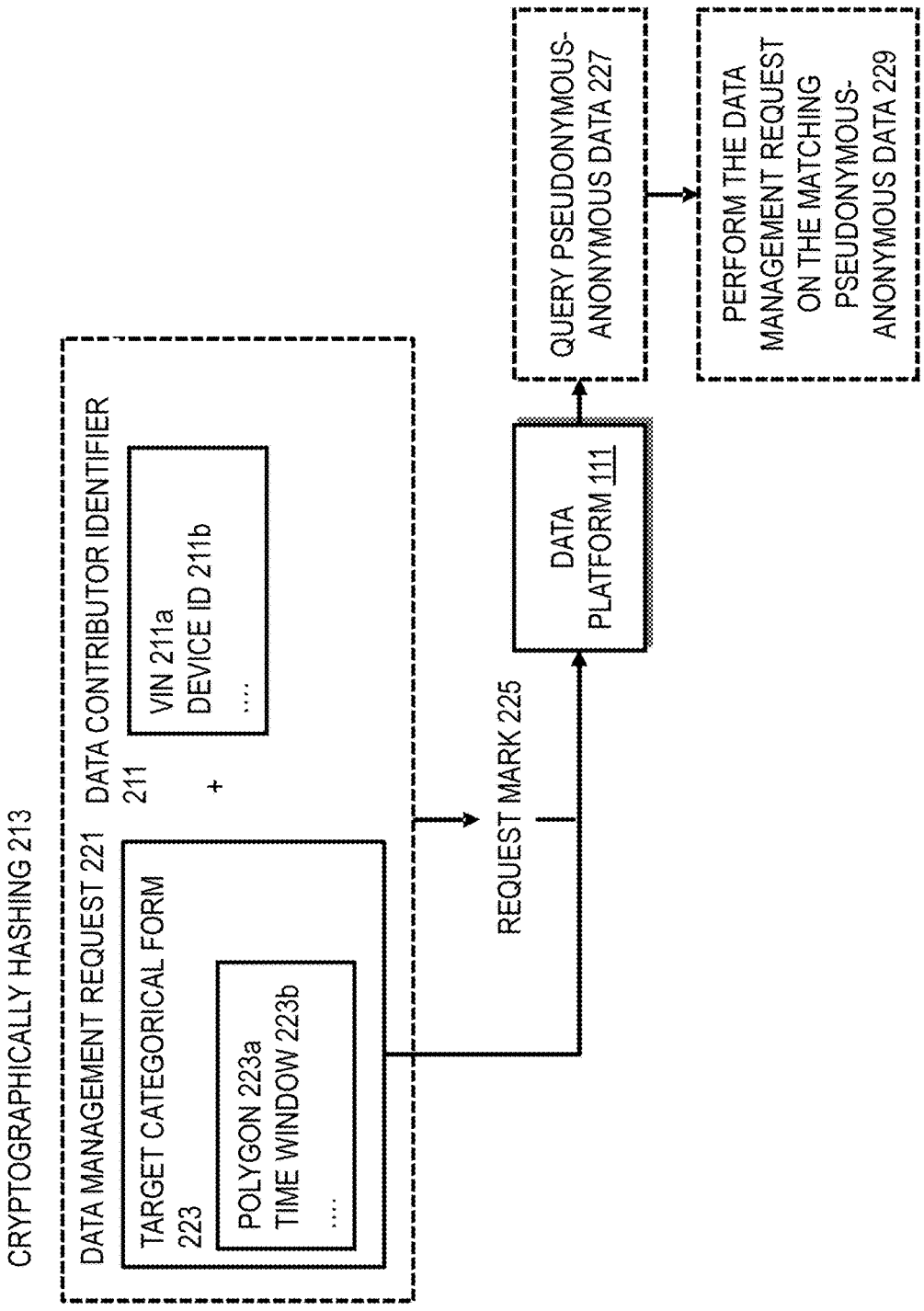

METHOD AND APPARATUS FOR MANAGING USER REQUESTS RELATED TO PSEUDONYMOUS OR ANONYMOUS DATA

BACKGROUND

As every aspect of lives revolves around consumer data such as name, address, credit card numbers, etc., almost every service such as social media, banks, retail purchases, etc. involve the collection and analysis of personal data. Data protection regulations, such as the EU General Data Protection Regulation (GDPR), offer data subjects a sets of rights related to giving platforms consent to data collection to be used in platform services and applications. GDPR requires platforms wanting to process personal data to employ anonymization or pseudonymization of the personal data such that the data cannot be attributed to an identifiable person or user. In addition, the platforms that collect user data are required to offer users the ability to exercise their rights to obtain, correct or delete their data from the platforms. A data platform cannot keep a user identifier in the data which would make the data personal, and no longer pseudonymous or anonymous anymore. On the other hand, the collected pseudonymous or anonymous data, cannot associate the user to the data anymore, thus the data platform cannot locate user-specific pseudonymous or anonymous data to fulfill user data management requests. Accordingly, the platforms face significant technical challenges of managing pseudonymous or anonymous user data to preserve privacy while fulfilling user data management requests.

SOME EXAMPLE EMBODIMENTS

Therefore, there is a need for an approach for managing pseudonymous or anonymous user data and relevant data management requests.

According to one embodiment, a method comprises converting a numerical feature of a data point into a categorical form. The categorical form represents a value range into which a numerical value of the numerical feature falls. The method also comprises determining an identifier of a data contributor associated with the data point. The method further comprises concatenating the identifier with the categorical form. The method further comprises cryptographically hashing the identifier concatenated with the categorical form to generate a mark. The method further comprises associating the mark with the data point to generate marked pseudonymous-anonymous data. The method further comprises transmitting the pseudonymous-anonymous data to a data platform.

According to another embodiment, an apparatus comprises at least one processor, and at least one memory including computer program code for one or more computer programs, the at least one memory and the computer program code configured to, with the at least one processor, cause, at least in part, the apparatus to receive pseudonymous-anonymous data comprising a data point associated with a mark that is a cryptographic hash of (1) a data contributor identifier and (2) a categorical form of a numerical feature of the data point. The apparatus is also caused to store the pseudonymous-anonymous data in an electronic database, to perform a data management function on the pseudonymous-anonymous data based on the mark.

According to another embodiment, a computer-readable storage medium carries one or more sequences of one or more instructions which, when executed by one or more processors, cause, at least in part, an apparatus to convert a numerical feature of a data point into a categorical form. The categorical form represents a value range into which a numerical value of the numerical feature falls. The apparatus is also caused to determine an identifier of a data contributor associated with the data point. The apparatus is further caused to concatenate the identifier with the categorical form. The apparatus is further caused to cryptographically hash the identifier concatenated with the categorical form to generate a mark. The apparatus is further caused to associate the mark with the data point to generate marked pseudonymous-anonymous data. The apparatus is further caused to transmit the pseudonymous-anonymous data to a data platform.

According to another embodiment, a computer program product may be provided. For example, a computer program product comprising instructions which, when the program is executed by a computer, cause the computer to convert a numerical feature of a data point into a categorical form. The categorical form represents a value range into which a numerical value of the numerical feature falls. The computer is also caused to determine an identifier of a data contributor associated with the data point. The computer is further caused to concatenate the identifier with the categorical form. The computer is further caused to cryptographically hash the identifier concatenated with the categorical form to generate a mark. The computer is further caused to associate the mark with the data point to generate marked pseudonymous-anonymous data. The computer is further caused to transmit the pseudonymous-anonymous data to a data platform.

According to another embodiment, an apparatus comprises means for receiving pseudonymous-anonymous data comprising a data point associated with a mark that is a cryptographic hash of (1) a data contributor identifier and (2) a categorical form of a numerical feature of the data point. The apparatus also comprises means for storing the pseudonymous-anonymous data in an electronic database, to perform a data management function on the pseudonymous-anonymous data based on the mark.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2B is a diagram of a pseudonymous or anonymous data managing process in response to user data management requests, according to one embodiment;

DESCRIPTION OF SOME EMBODIMENTS

Examples of a method, apparatus, and computer program for managing pseudonymous or anonymous user data and relevant data management requests are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term categorical form refers to a sort of a binned version of a continuous value (e.g., a time of 8:07 am falls into the categorical form of 8:00 am-8:30 am for a time window of 30 mins). The smaller the window, the more categorical forms you have (i.e., more processing and categories, but greater resolution). On the other hand, the larger the window, the lesser resolution yet fewer categories (e.g., one day would have 24 30-min windows/categorical forms versus 12 1-hr windows).

Although the various embodiments discussed herein refer to protect user data privacy, it is contemplated that the approaches presented in the embodiments are also applicable to any type of confidential data (e.g., business data, financial data, national security data, intellectual property data, etc.) that can be exported from a data contributor. Moreover, although the categorical forms described herein are converted from numerical features as time-based and/or location-based, it is contemplated that the numerical features presented in the embodiments can also be other contextual parameters (e.g., by contact, by activity, etc.) as long as the parameter changes frequently to provide different marks for the user, so inference is unlike to make between the data and the user. For instance, when the user is a hair-stylist, the hair service data can be converted based on customer numbers. As another instance, when the user is an athlete, the training data can be converted based on exercise type numbers.

Figure 1:
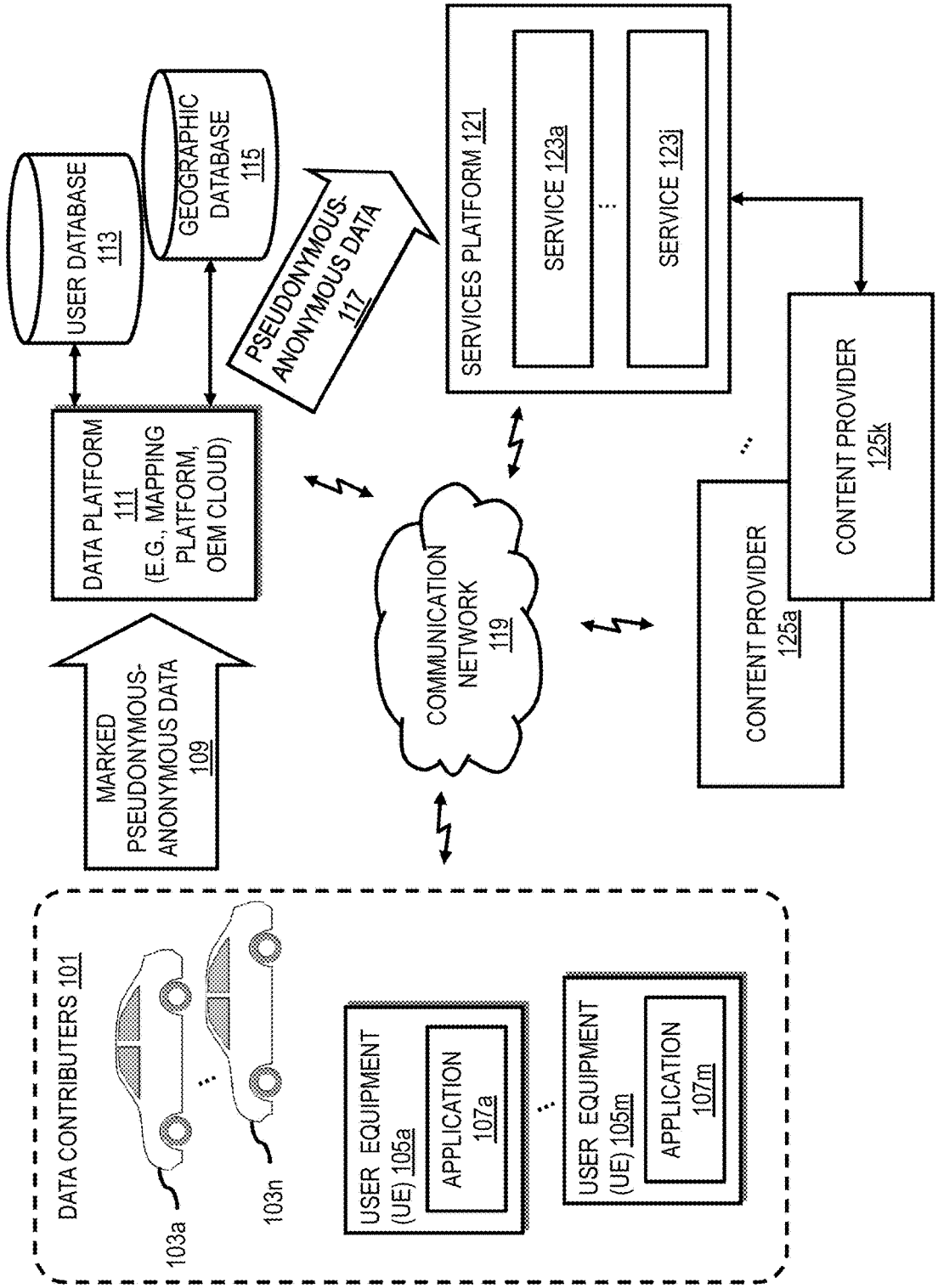
FIG. 1 is a diagram of a system capable of managing pseudonymous or anonymous user data and relevant data management requests, according to one embodiment.

FIG. 1 is a diagram of a system capable of managing pseudonymous or anonymous user data and relevant data management requests, according to one embodiment. Pseudonymization is defined in the GDPR as: "The processing of personal data in such a manner that the personal data can no longer be attributed to a specific data subject without the use of additional information, provided that such additional information is kept separately and is subject to technical and organizational measures to ensure that the personal data are not attributed to an identified or identifiable natural person." Personal data can be any information to be used directly or indirectly identify an individual, such as names, home addresses, photos, email addresses, bank data, medical information, device IDs, vehicle IDs, posts on social networking websites, etc.

Pseudonymization replaces a user identifier with another random identifier, in a way that it cannot be associated back to the original user identifier. Pseudonymizing methods include data masking, encryption, tokenization, etc. A data subject's pseudonymized data can be reidentified with that individual by replacing the pseudonyms with the actual identifier. Pseudonymous data is still considered as personal data by privacy regulations, as it is relatively easy to associate the pseudonym to an identifier and to infer additional information about the data. In contrast, anonymous data does not contain any pseudonym, such that it is impossible to identify which data belongs to the same user. User data management requests to obtain, delete or modify user data require the data to contain some sort of identifier; however, no technology exists to fulfill data management requests under Data Protection Regulations (such as e.g. GDPR, CCPA etc.) for pseudonymous or anonymous user data while providing sufficient user data privacy against the data platform.

Although pseudonymization can replace a user identifier with another random identifier, in a way that it cannot be associated back to the original identifier, all data belonging to that user will share the same random identifier. In this case, the user could memorize the pseudonym that identifies their data on the platform and communicate it with the request to obtain, delete/modify data. However, given that all data belonging to the user shares the same random identifier, the data platform can still infer what percentage of the data the user decided to obtain, delete, or modify. The data platform could even track how many data management requests were sent by the specific user.

To address this problem, a system 100 of FIG. 1 introduces a protocol based on cryptographic hashing that allows a data platform to select pseudonymous-anonymous data belonging to a user without revealing anything about how the pseudonymous-anonymous data is associated to the user. Hashing is a one-way transformation of data to a cryptic piece of data (hash value). For example, a hashing algorithm can compute the hash value by adding the ascii values in a string, hashing of the plain text of the values using SHA-256, SHA-512, etc. In one embodiment, the system 100 can mark the pseudonymous-anonymous data that belongs to a specific user with values that are associated to the specific user but look unrelated to each other.

Figure 2A:
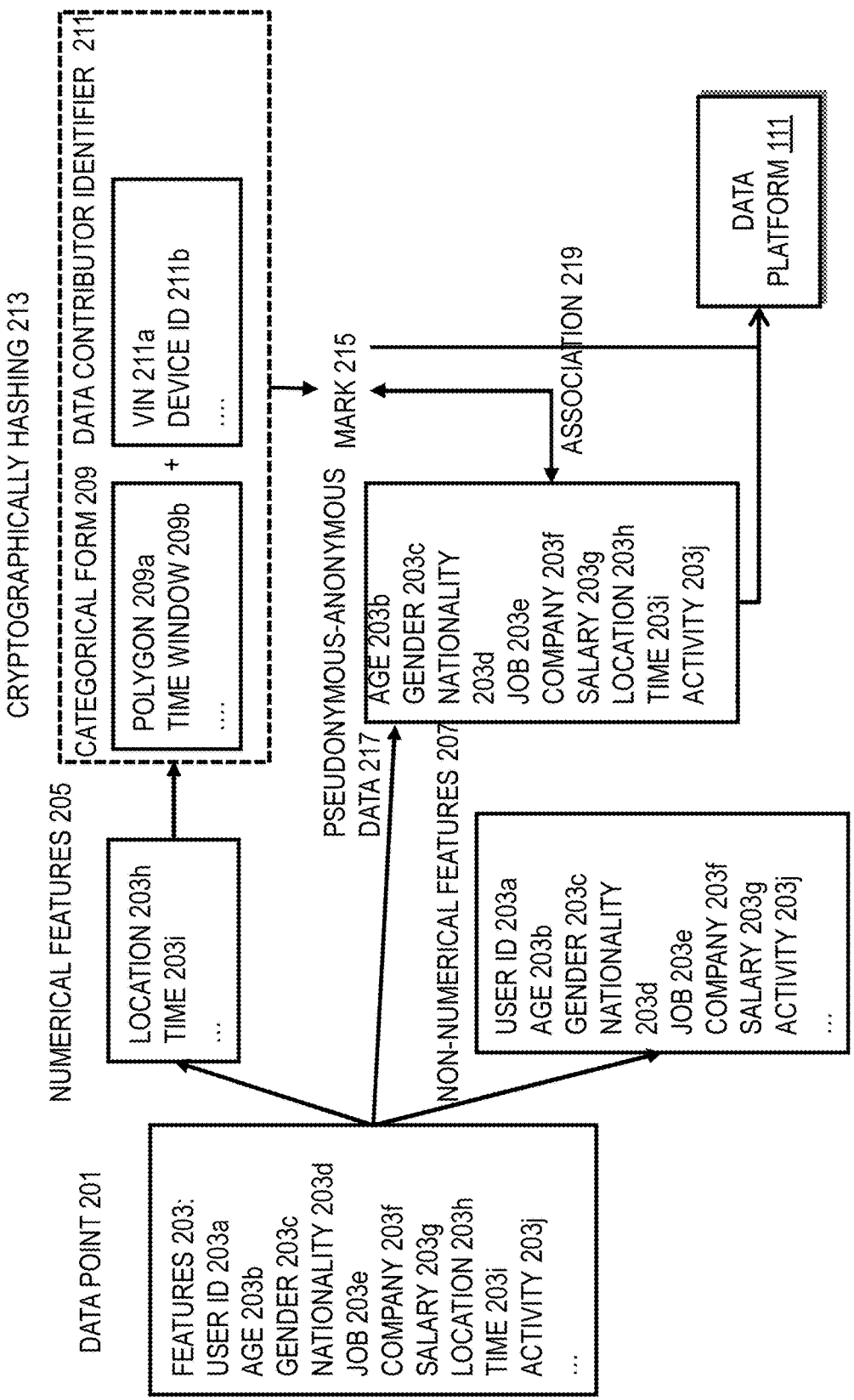
FIG. 2A is a diagram of a pseudonymous or anonymous user data marking process, according to one embodiment.

For instance, the system 100 can collect and manage user data from one or more data contributors 101, such as vehicles 103a-103n (also collectively referenced to herein as vehicle 103), user equipment (UE) 105a-105m (also collectively referenced to herein as UEs 105) installed with applications 107a-107m (also collectively referenced to herein as applications 107), etc. based on the processes in FIGS. 2A-2B. For instance, the UE 105 or an intermediary (e.g. the application 107a) that collects and shares the data on behalf of the user, can set up a hashing mechanism that will be used to mark pseudonymous or anonymous user data into marked pseudonymous-anonymous user data 109. FIG. 2A is a diagram of a pseudonymous or anonymous user data marking process, according to one embodiment. The marking scheme is applicable to both pseudonymous user data and anonymous user data, such that the term pseudonymous-anonymous user data includes pseudonymous user data and/or anonymous user data, and the term marked pseudonymous-anonymous user data includes marked pseudonymous user data and/or marked anonymous user data. The system 100 can then transmit the marked pseudonymous-anonymous user data 109 to a data platform 111.

To generate a mark as a "feature ID" for a data point 201 associated with the UE 105, the system 100 can select one or more numerical features of the data point 201 (e.g. a current time, a current location, etc.) to convert into a respective categorical form using a well-known and deterministic transformation. For example, the data point 201 can include features 203 such as user ID 203a, age 203b, gender 203c, nationality 203d, job 203e, company 203f, salary 203g, location 203h, time 203i, activity 203j, etc. In this case, the data point 201 appears to be work-related, such that the numerical features 205 include location 203h and time 203i, while the non-numerical features 207 include the remaining features. As mentioned, the numerical features vary in values so as to be converted categorical forms 209 then into different marks for the user, such that inference is unlike to make between the data point 201 and the user as in the same pseudonym per user scenario.

For instance, the current location 203h can be converted into a polygon 209a, e.g., a map tile #12345. In this case, the polygon 209a can be further adjusted based on a tiling scheme such as quad-keys, where the polygon 209a covered by the tile is dependent on a zoom level. The representation of the corresponding categorical value is used as a feature ID. As another instance, the current time 203i can be converted into a time window 209b, e.g. 12/01/2021 for a day-long time window, 12:10 on 12/01/2021 for a 10-min time window, etc.

In one embodiment, the system 100 can concatenate the user ID 203a and/or a data contributor ID 211 (e.g., a vehicle identification number (VIN) 211a of the vehicle 103, a device ID 211b of the UE 105, etc.) with one or more of the categorical forms 209 and apply cryptographically hashing 213 into a mark 215. For instance, the system 100 can hash the VIN, the time window 12/01/2021, and map tile #12345 into the mark 215 that relates the combination of user and data features. The system 100 then can generate an association 219 between the mark 215 and pseudonymous-anonymous data 217 (e.g., the data point 201 striped away the user ID 203a), and transit the marked pseudonymous-anonymous data to the data platform 111.

The data platform 111 can store the marked pseudonymous-anonymous data in a user database 113. The data platform 111 can be a mapping platform (e.g., HERE WeGo), an automotive original equipment manufacturer (OEM) cloud (e.g., FOLD cloud), a social media platform (e.g., FACEBOOK), a search engine (e.g., GOOGLE).

When the data platform 111 is a mapping platform or an OEM cloud, user data can be collected as a trajectory representing a sequence of data entries per individual moving entity (e.g., also referred to as a probe device such as a vehicle), where each entry consists of location (latitude, longitude), time stamp, a pseudonym (e.g., a unique probe identifier to indicate which of the entries belong to the same entity), and possibly various additional information about the entity at the time (e.g., vehicle sensor data, speed, heading etc.). The data platform 111 can store the marked pseudonymous-anonymous data in the user database 113 and/or a geographic database 115. Including the marks 215 in the pseudonymous-anonymous data 217 or storing the marks 215 with the pseudonymous-anonymous data 217 requires additional storage capacity in the data platform 111.

The data platform 111 can provide pseudonymous-anonymous data 117 (e.g., transmitted/received over a communication network 119) to/from any authorized service or application requesting the data. The authorized services or applications can include but are not limited to services platform 121, services 123 (e.g., advertising and marketing services, mapping services, navigation services, transportation services, social media services, location-based data services, etc.), content providers 125, or equivalent. In this way, privacy-sensitive data collected from the data contributors 101 are not exposed the data platform 111 yet fulfilling user data management requests.

FIG. 2B is a diagram of a pseudonymous or anonymous data managing process in response to user data management requests, according to one embodiment. To fulfill user data management requests, the system 100 can receive a user input of a data management request 221 specifying values for data features that can be converted into at least one target categorical form 223, e.g., a polygon 223a (e.g., the map tile #12345), a time window 223b (e.g. 12/01/2021), etc. The values for data features can be broad. For instance, the target categorical form 223 (e.g., 12/01/2021) fully overlaps with the categorical form 209 (e.g., 12/01/2021).

The system 100 can apply the cryptographically hashing 213 on the at least one target categorical form 223 into a request mark 225, and then transmit the request mark 225 to the data platform 111. The user provides a data management request, e.g., data deletion, which is associated to one or more data features. The data features on which the request is based shall be the same as those used to generate the marks 215. The definition of the data features shall match the value of the parameter that was used at the time of the data collection, e.g., if a time window size of 10 mins was chosen at the time of the data collection, the request related to the same data collection shall be produced using time windows of 10 mins. Changes in the parameter shall be memorized by the system 100 in order to generate the correct data features then the request mark 225. In other words, the UEs 105 are required to remember which data feature values were used to generate the marks 215 of a specific time period related to a specific request, which requires additional storage capacity on the UEs 105 or on the intermediary's infrastructure.

The data platform 111 can query the user database 113 and/or a geographic database 115 using the request mark 225 for pseudonymous-anonymous data 227 marked with a mark matched with the request mark 225. The system 100 can then perform the data management request 221 on the matching pseudonymous-anonymous data 229.

In one embodiment, the data management request 221 can be refined with additional constraints, e.g., based on a geo-fence. The data platform 111 can match the additional constraints onto attributes of the data other than the marks, e.g., the GPS coordinates. For example, the user can request to delete data related to a visit to a hospital using a precise time window of the visit, or the day of the visit, and the location of the hospital.

As such, the data platform 111 cannot infer from the value of the marks either the user ID or the data features. At most, upon receiving a user data management request and matching the corresponding pseudonymous-anonymous data, the data platform 111 may infer the data features and the respective feature parameters, when the pseudonymous-anonymous data is dense enough. For example, the data platform 111 can infer a time window size of 10 minutes by noticing that the first matching point is at 12:10:02 and the last is at 13:29:46. This inference might be wrong when the pseudonymous-anonymous data is not dense enough, e.g., the time window parameter could have been 20 minutes, but no data was generated after the first 10 minutes.

In one embodiment, the system 100 supports a user to specify parameter to drive the conversion to a categorical form, e.g., a parameter specifying a time window size of 10 minutes. A smaller size allows more accurate/precise requests, e.g., to delete all data from 3:00 to 5:00 on 12/01/2021 vs all data of 12/01/2021. A smaller size also consumes more computational and network resources as more categorical forms must be generated and transmitted to the data platform 111, as well as to be matched to the requested data. In another embodiment, the system 100 can automatically specify a size of a categorical form based on the nature of the data points, available computational and network resources and costs, user preferences, user request history, etc.

In one embodiment, the system 100 can include marks 215 in an anonymous dataset, particularly when the data feature size is large (which may be considered as pseudonymous instead of anonymous). For instance, upon receiving a data management request from one user, the data platform 111 may process large amounts of data related to that user, who can contain enough information to re-identify the user, e.g., to-be-deleted trajectory data revealing the user's home address. To mitigate such risk, the system 100 can (1) deploy smaller data feature sizes, or (2) hide the link between the user and the data by encrypting the execution of the data management request with technology such as trusted computing (e.g., through hardware enhancements and associated software modifications), homomorphic encryption (e.g., performing computations on encrypted data without first decrypting the data), etc.

Therefore, the data contributor 101 (e.g., a vehicle 103, a UE 105, etc.) never has to share its identifier (e.g., VIN, device ID, etc.) with the data platform 111. Only the cryptographic hash (e.g., the mark 215) is shared to protect privacy. The data platform 111 can search based on the mark, as the correct time window/location polygon were already encoded in the mark. The system 100 can also minimize data inference by the digital platform 111. In particular, the system 100 can provide advantages over a pseudonym-based approach by using the marks ("feature IDs") that rotate frequently, so inference from the data with the user is unlikely. For example, a data management request related to Monday's data would not allow inferring which data is associated to the same user on Tuesday. The advantage over frequently changing pseudonyms is that such pseudonyms must be memorized/stored in the UEs 105 for future requests, while the request marks 225 can be generated at the UEs 105 from the user IDs and data features on demand.

Figure 3A:
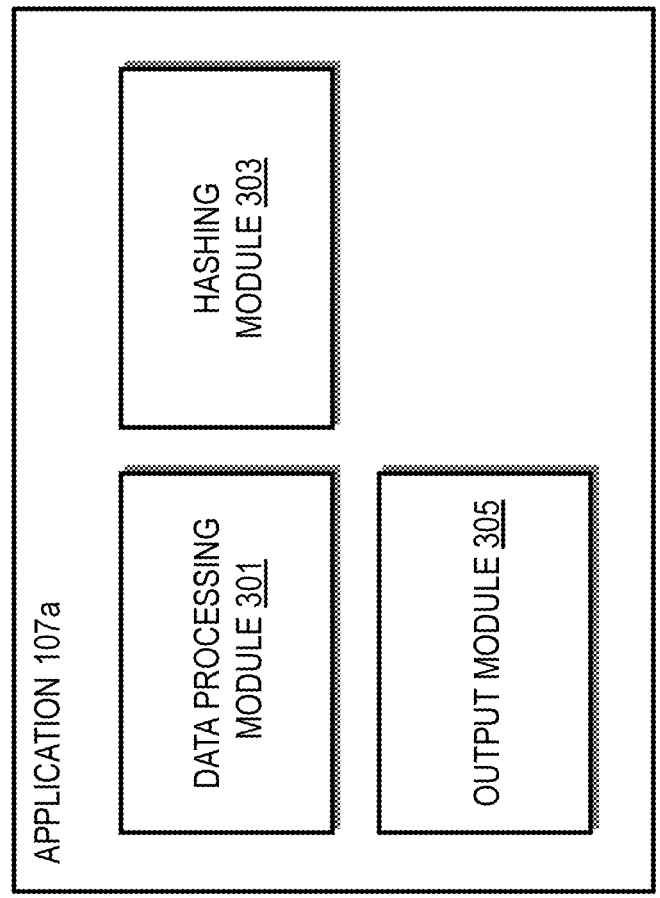
FIG. 3A is a diagram of the components of an application, according to one embodiment.

FIG. 3A is a diagram of the components of an application, according to one embodiment. For instance, the application 107a residing in the UE 105 includes one or more components for marking pseudonymous or anonymous user data at a data contributor, according to the various embodiments described herein. As shown in FIG. 3A, the application 107a includes a data processing module 301, a hashing module 303, and an output module 305. The above presented modules and components of the application 107a can be implemented in hardware, firmware, software, or a combination thereof. It is contemplated that the functions of these components may be combined or performed by other components of equivalent functionality. Though depicted as a separate entity in FIG. 1, it is contemplated that the application 107a may be implemented as a module of any of the components of the system 100 (e.g., a component of the AD service 107a). In another embodiment, the application 107a and/or one or more of the modules 301-305 may be implemented as a cloud-based service, local service, native application, or combination thereof. The functions of these modules are discussed with respect to FIGS. 4 and 6 below.

Figure 4:
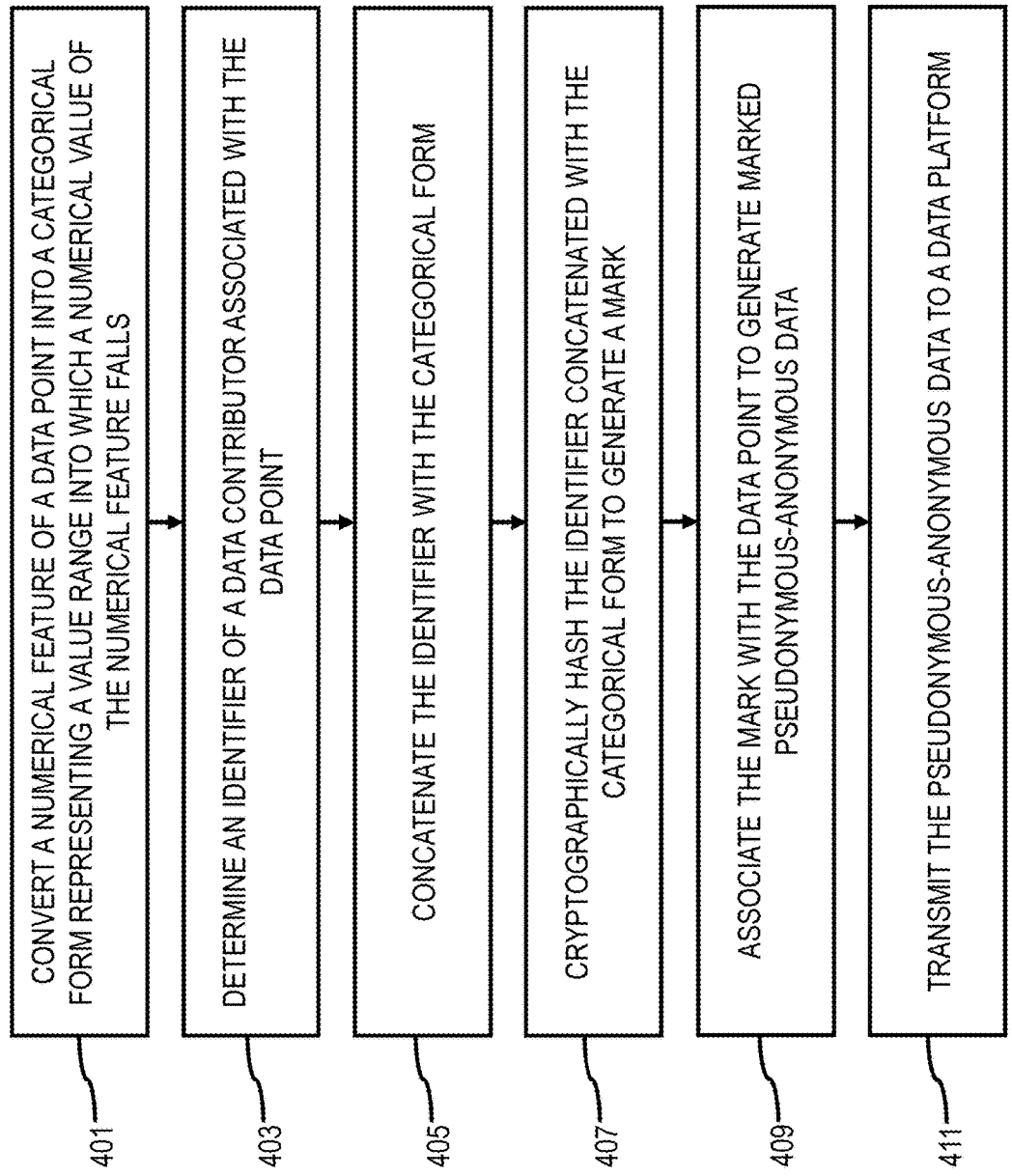
FIG. 4 is a flowchart of a process for marking pseudonymous or anonymous user data at a data contributor, according to one embodiment.
Figure 9:
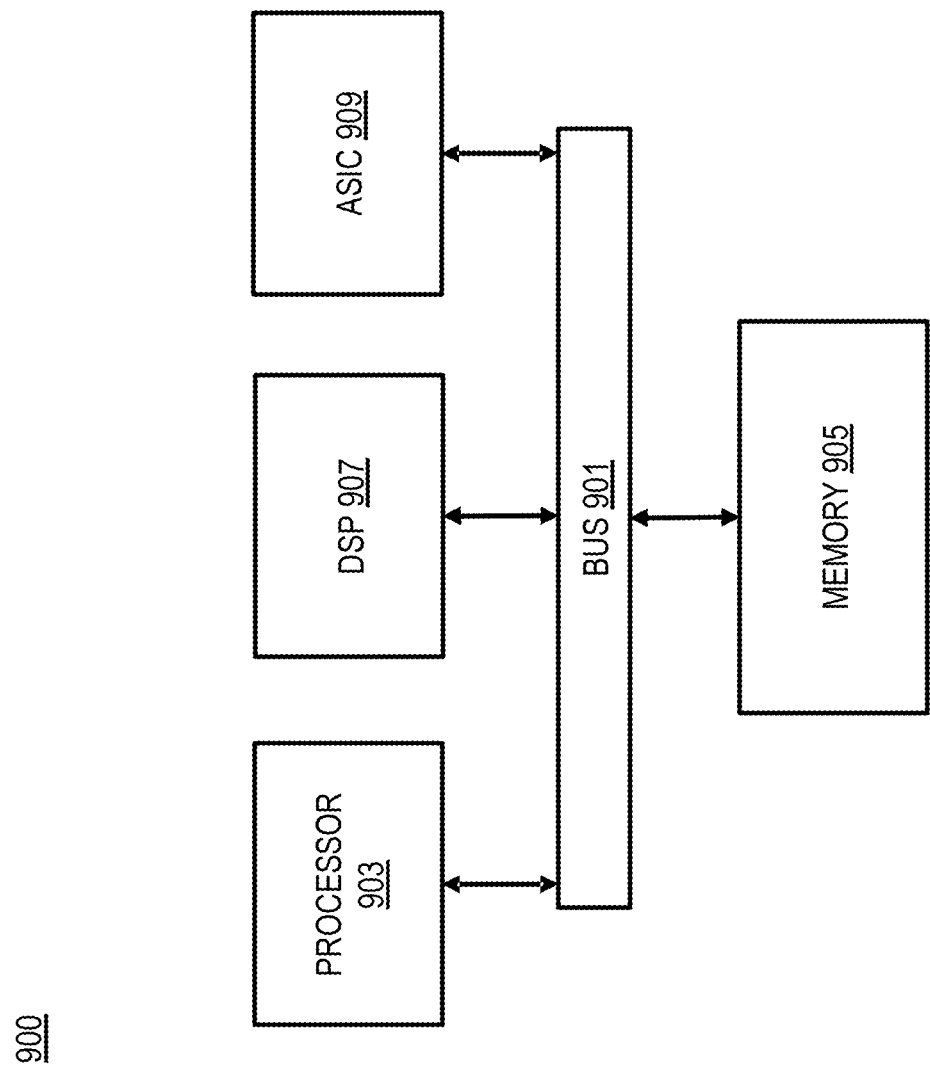
FIG. 9 is a diagram of a chip set that can be used to implement example embodiment(s)

FIG. 4 is a flowchart of a process for marking pseudonymous or anonymous user data at a data contributor, according to one embodiment. In various embodiments, the application 107a and/or any of the modules 301-305, may perform one or more portions of the process 400 and may be implemented in, for instance, a chip set including a processor and a memory as shown in FIG. 9. As such, the application 107a and/or any of the modules 301-305 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all of the illustrated steps. More specifically, the process 400 illustrates a process for marking pseudonymous or anonymous user data at a data contributor.

In one embodiment, for example in step 401, the data processing module 301 can convert a numerical feature of a data point (e.g., the data point 201 in FIG. 2A) into a categorical form (e.g., the categorical form 209). The categorical form can represent a value range (e.g., the polygon 209a, the time window 209b, etc.) into which a numerical value of the numerical feature falls. In one embodiment, the numerical feature can be a time of a data collection of the data point (e.g., 12:10-12/01/2021), and the value range can be a time window (e.g., 10 minute). In another embodiment, the numerical feature can be a point location (e.g., a location when taking the data point 201) associated with the data point, and the value range can be a polygon (e.g., map tile #12345) representing a geographic area.

In one embodiment, in step 403, the data processing module 301 can determine an identifier of a data contributor (e.g., the data contributor 101, such as the vehicle 103, the UE 105, etc.) associated with the data point. For instance, the data point can be part of vehicle trajectory data collected by one or more sensors of a vehicle, a device (e.g., the vehicle 103), or a combination thereof traveling within a geographic area.

In one embodiment, in step 405, the hashing module 303 can concatenate the identifier (e.g., the VIN 211a, the Device ID 211b, etc.) with the categorical form.

In one embodiment, in step 407, the hashing module 303 can cryptographically hash the identifier concatenated with the categorical form (e.g., VIN+01/01/2021+12345) to generate a mark (e.g., the mark 215).

In one embodiment, in step 409, the data processing module 301 can associate the mark with the data point to generate marked pseudonymous-anonymous data (e.g., the marked pseudonymous-anonymous user data 109).

In one embodiment, in step 411, the output module 305 can transmit the pseudonymous-anonymous data (e.g., the pseudonymous-anonymous data 217) to a data platform (e.g., the data platform 111). By way of example, the categorical form, the value range, or a combination thereof can be predetermined and shared between a data collection device (e.g., the vehicle 103, the UE 105, etc.) and the data platform (e.g., the data platform 111) associated with collecting and storing the data point (e.g., the data point 201). For instance, the mark 215 ("feature ID") can be based on a vehicle identification number (VIN) associated with a vehicle (e.g., the vehicle 103) from which the data point is collected.

Nevertheless, even if the data platform 111 is unaware of the chosen categorical form(s) and parameter(s), the data platform 111 can match only the request mark(s) with its stored marks to retrieve data in a data management request. As mentioned, the data platform 111 can offer additional constraint parameter(s) to refine the data retrieval, e.g., providing a polygon in which user data should be deleted. The additional constraint parameter(s) can be independent of whether a specified location is among the chosen categorical forms.

Subsequently, the data processing module 301 can receive an input specifying a target categorical form (e.g., the target categorical form 223 in FIG. 2B) associated with a data management request (e.g., the target categorical form 223), concatenate the identifier (e.g., the VIN 211a, the Device ID 211b, etc.) with the target categorical form, cryptographically hash the identifier with the target categorical form to generate a request mark (e.g., the request mark 225), and transmit the data management request with the request mark to the data platform (e.g., the data platform 111). The data platform can use the request mark to query for the pseudonymous-anonymous data that match the data management request.

In another embodiment, the data management request can include an additional constraint parameter (e.g., GPS coordinates, etc.), and the data platform can use the additional constraint parameter to further query for the pseudonymous-anonymous data that matches the data management request. For instance, the additional constraint parameter can be a geo-fence (e.g., a hospital).

Figure 3B:
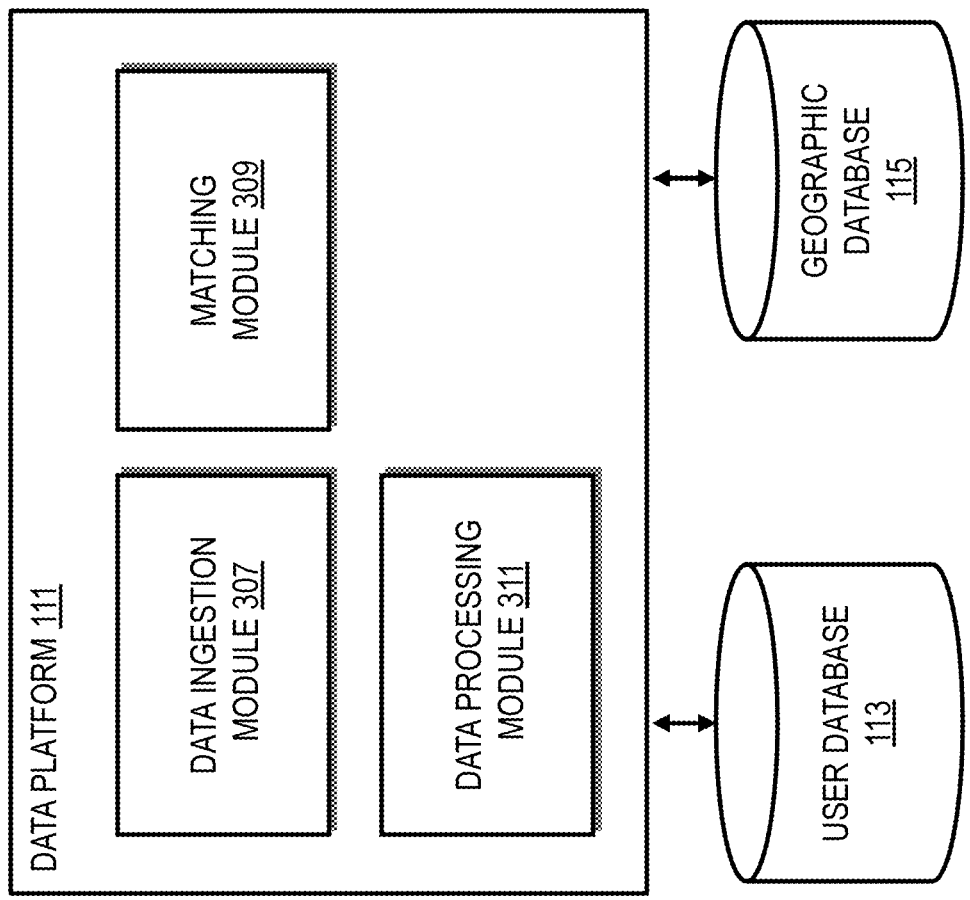
FIG. 3B is a diagram of the components of a data platform, according to one embodiment.

FIG. 3B is a diagram of the components of a data platform, according to one embodiment. For instance, the data platform 111 includes one or more components for providing navigation and location recommendation based on geospatial vaccination data, according to the various embodiments described herein. As shown in FIG. 3B, the data platform 111 includes an data ingestion module 307, a matching module 309, and a data processing module 311. The above presented modules and components of the data platform 111 can be implemented in hardware, firmware, software, or a combination thereof. It is contemplated that the functions of these components may be combined or performed by other components of equivalent functionality. Though depicted as a separate entity in FIG. 1, it is contemplated that the data platform 111 may be implemented as a module of any of the components of the system 100 (e.g., a component of the services 123). In another embodiment, the data platform 111 and/or one or more of the modules 307-311 may be implemented as a cloud-based service, local service, native application, or combination thereof. The functions of these modules are discussed with respect to FIG. 5 below.

Figure 5:
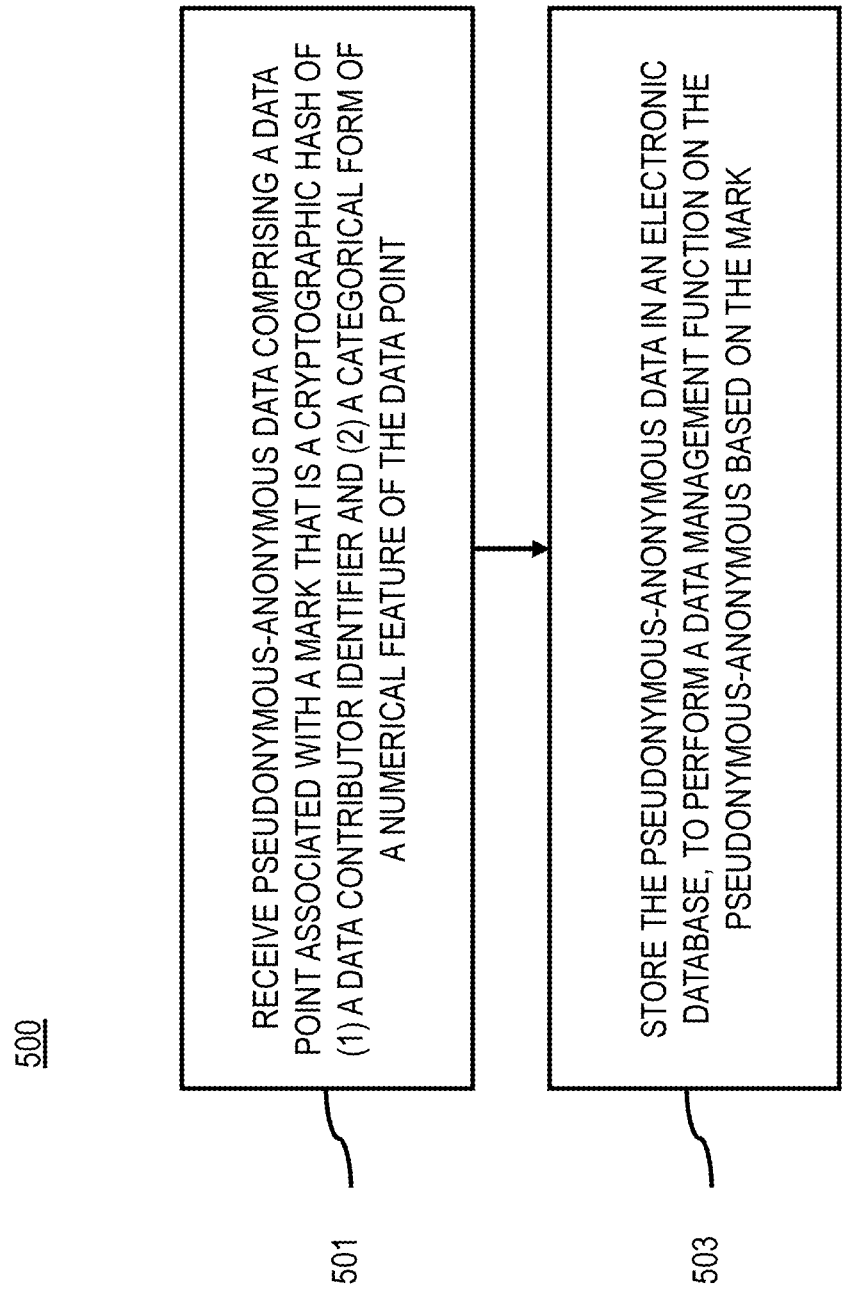
FIG. 5 is a flowchart of a process for managing marked pseudonymous or anonymous user data at a data platform, according to one embodiment.

FIG. 5 is a flowchart of a process for managing marked pseudonymous or anonymous user data at a data platform, according to one embodiment. In various embodiments, the data platform 111 and/or any of the modules 307-311 may perform one or more portions of the process 500 and may be implemented in, for instance, a chip set including a processor and a memory as shown in FIG. 9. As such, the data platform 111 and/or any of the modules 307-311 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all of the illustrated steps. More specifically, the process 500 illustrates a process for managing marked pseudonymous or anonymous user data at a data platform.

In one embodiment, for example in step 501, the data ingestion module 307 can receive pseudonymous-anonymous data (e.g., the pseudonymous-anonymous data 217 in FIG. 2A) comprising a data point (e.g., the data point 201) associated with a mark (e.g., the mark 215) that is a cryptographic hash of (1) a data contributor identifier (e.g., the VIN 211a, the Device ID 211b, etc.) and (2) a categorical form (e.g., the categorical form 209) of a numerical feature of the data point. In one embodiment, the numerical feature can be a time of a data collection (e.g., 12:10-12/01/2021) of the data point, and the categorical form can be a time window (e.g., 10 minutes) for binning the time of the data collection. In one embodiment, the numerical feature can be a point location associated with the data point (e.g., a location when taking the data point 201), and the categorical form can be a polygon (e.g., map tile #12345) representing a geographic area for binning the point location.

In one embodiment, in step 503, the data ingestion module 307 can store the pseudonymous-anonymous data in an electronic database (e.g., the user database 113), to perform a data management function on the pseudonymous-anonymous data (e.g., the pseudonymous-anonymous data 217) based on the mark (e.g., the mark 215). For instance, the data ingestion module 307 can receive a data management request (e.g., the data management request 221 in FIG. 2B) specifying a request mark (e.g., the request mark 225), and the request mark can be a cryptographic hash of (1) the identifier of the data contributor (e.g., the VIN 211*a*, the Device ID 211*b*, etc.), and (2) a target categorical form (e.g., the target categorical form 223 that fully overlaps with the categorical form 209) for selecting the pseudonymous-anonymous data that is a target of the data management request. The matching module 309 can query the pseudonymous-anonymous data associated with a respective mark that matches the request mark (e.g., the request mark 225), and then the data processing module 311 can perform the data management request on the matching pseudonymous-anonymous data. The data ingestion module 307 can store the processed pseudonymous-anonymous data back to the user database 113.

In one embodiment, the data management request includes an additional constraint parameter (e.g., GPS coordinates, a geo-fence, etc.), and the matching module 309 can use the additional constraint parameter to further query for the pseudonymous-anonymous data that match.

Figure 6A:
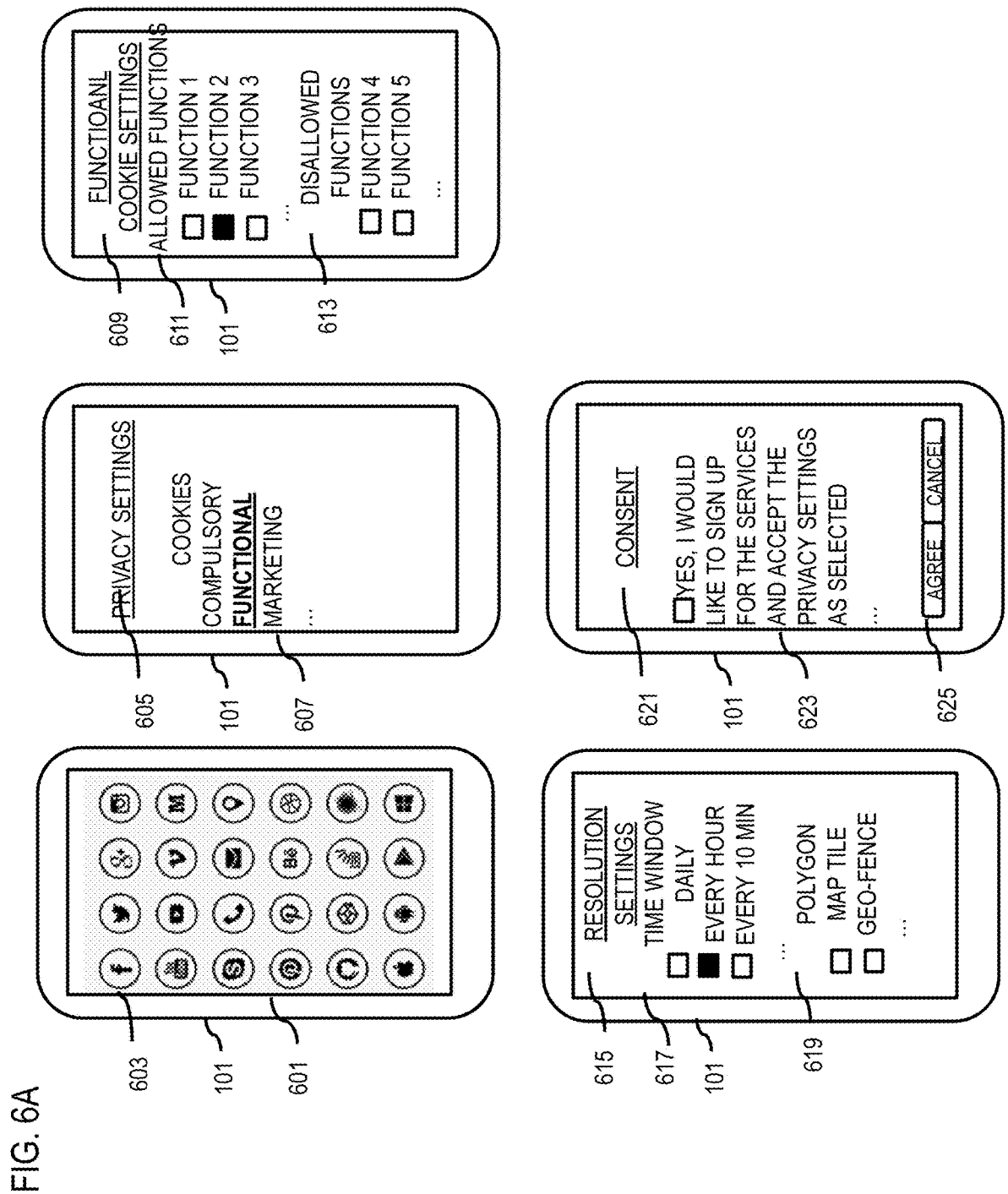
FIGS. 6A-6B are diagrams of example user interfaces depicting processes for managing pseudonymous or anonymous user data and relevant data management requests, according to various example embodiments.
Figure 6B:
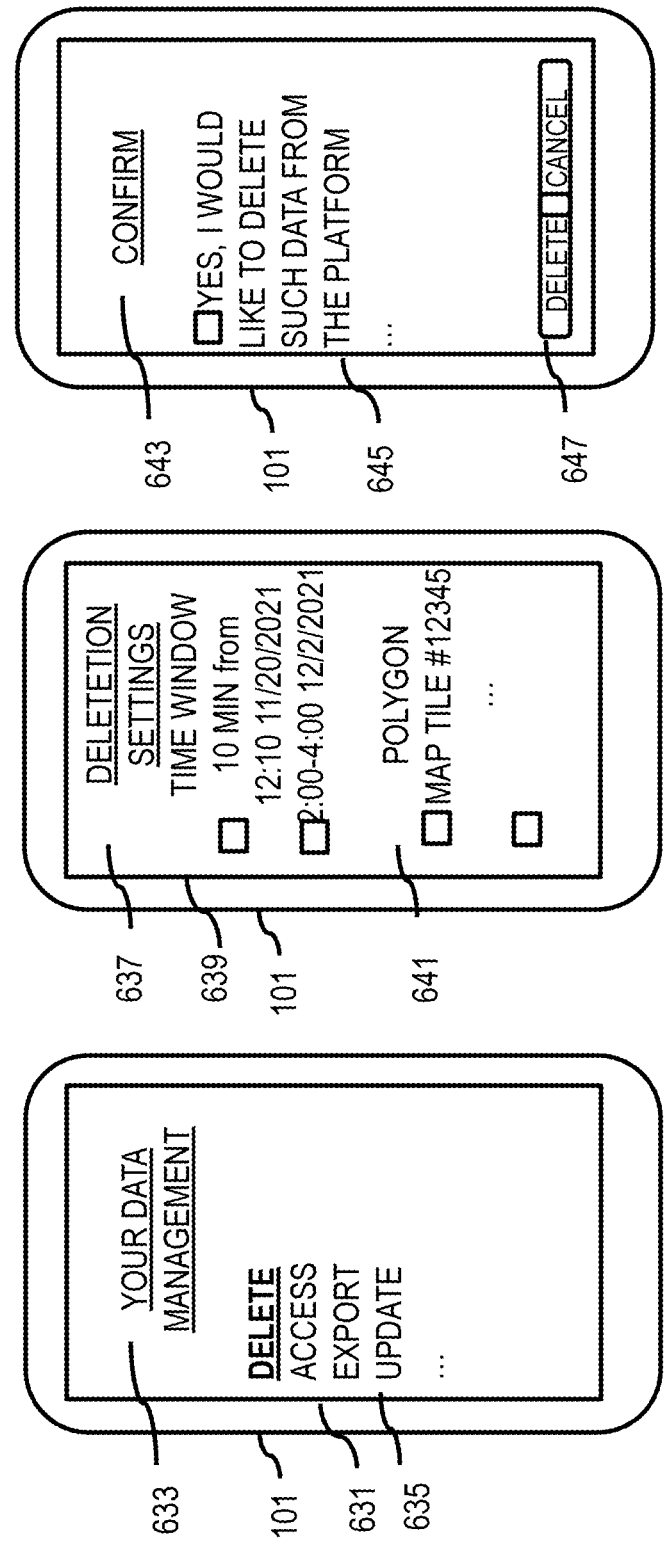

FIGS. 6A-6B are diagrams of example user interfaces depicting processes for managing pseudonymous or anonymous user data and relevant data management requests, according to various example embodiments. FIG. 6A depicts a user interface (UI) 601 of a data contributor 101 (e.g., UE 105). For instance, the UI 601 depicts application icons 603 for a user to select. In this example, after a user selection of a social media icon, the UI 601 can present a privacy settings screen 605, for example, regarding cookies 607, such as compulsory cookies, functional cookies, marketing cookies, etc.

After a user selection of the functional cookies, the UI 601 can present a functional cookie settings screen 609 that includes an allowed function sub-list 611 and a disallowed function sub-list 613, for the user to select. In addition, the UI 601 can present a resolution settings screen 615 that categorical forms of different numerical data features and of various sizes, such as time windows 617, polygons 619, etc. for the user to select. At the end, the UI 601 can present a consent screen 621 with a statement 623: "Yes, I would like to sign up for the services and accept the privacy settings as selected," and two buttons 625 of "agree" and "cancel" for the user to select. The system 100 can then collect and mark user data based on the specified privacy settings and the above-described embodiments.

FIG. 6B depicts a UI 631 showing a data management screen 633 with options 635 such as delete, access, export, update, etc. The Delete option allows the user to delete the user data from the data platform 111 whenever the user like ("the Right to be Forgotten"). Such data deletion requests cover the data controller and any third party data processors. The Access option allows the user to download and see the user data and how the user is processed. Furthermore, the data platform 111 has to inform the user on details about the processing, such as the purposes of the processing, with whom the data is shared, and how it acquired the data ("the Right of Access"). The Export option can be required for users to inspect their own data, and/or for compatibility (so as to move the data from one platform to another if needed) under Data Protection Regulations. The data must be provided by the data platform in a structured and commonly used standard electronic format ("data Portability"). The Update option allows the user to ask the data platform 111 to immediately correct (public or private) data that is invalid.

For instance, after a user selection of the Delete option, the UI 631 can present a deletion settings screen 637 which lists categorical forms, such as time windows 639, polygons 641, etc. corresponding to the resolution settings at the data collection stage, in order to retrieve the desired user data, e.g., 10 min from/to 12:10 11/20/2021, 2:00-4:00 12/2/2021, map tile #12345, etc. For instance, the system 100 can present two selections: time from and time to for user selection. The system 100 can then produce all time windows contained within the two specified time boundaries, e.g., 2:00 and 4:00. Same could be done with the spatial component by letting the user trace a boundary, such as a hospital, a university, etc. on a map.

As another example, when the UE 105 locally keeps track of different journeys/trajectories. By the user selecting to delete/export/update a journey, the system 100 can convert the data about a journey into a categorical form, determine the associated marks, and submit a data management request to the data platform 111 to delete/export/update the journey data.

After the system 100 locates user data with matched mark(s) as in the above-described embodiment, the UI 631 can present a deletion confirmation screen 643 with a statement 645: "Yes, I would like to delete such data from the data platform," and two buttons 647 of "delete" and "cancel" for the user to select.

Returning to FIG. 1, the services 123 may also be other third-party services and include traffic incident services, travel planning services, notification services, application services, storage services, contextual information determination services, etc.

In one embodiment, the data platform 111 may be a platform with multiple interconnected components. The data platform 111 may include multiple servers, intelligent networking devices, computing devices, components, and corresponding software for managing pseudonymous or anonymous user data and relevant data management requests. In addition, it is noted that the data platform 111 may be a separate entity of the system 100, a part of the services platform 121, or a part of the one or more services 123.

In one embodiment, content providers 125 may provide content or data (e.g., including sensor data, traffic reports, probe data, news, movies, etc.) to the data platform 111, the UEs 105, the applications 107, the services platform 121, the services 123, and the geographic database 115. The content provided may be any type of content, such as map content, textual content, audio content, video content, image content, etc. In one embodiment, the content providers 125 may also store content associated with the data platform 111, the services platform 121, the services 123, the geographic database 115, and/or the UEs 105. In another embodiment, the content providers 125 may manage access to a central repository of data, and offer a consistent, standard interface to data, such as a repository of the user database 113 and/or the geographic database 115.

By way of example, the UEs 105 are any type of mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 105 can support any type of interface to the user (such as "wearable" circuitry, etc.). In one embodiment, a UE 105 may be associated with a vehicle 103 (e.g., a mobile device) or be a component part of the vehicle 103 (e.g., an embedded navigation system). In one embodiment, the UEs 105 may interact with the content providers 125 (e.g., a shop) and the data platform 111 to manage pseudonymous or anonymous user data and relevant data management requests.

In one embodiment, the vehicle 103 and/or the UE 105 may also be configured with various sensors (not shown for illustrative convenience) for acquiring and/or generating sensor data and/or probe data associated with managing pseudonymous or anonymous user data and relevant data management requests. For example, such sensors may be used as GNSS receivers for interacting with the one or more satellites to determine and track the current speed, position, and location of the vehicle 103 and/or the UE 105. Further, the location can be determined by visual odometry, triangulation systems such as A-GPS, Cell of Origin, or other location extrapolation technologies.

In addition, the sensors may gather tilt data (e.g., a degree of incline or decline of the vehicle during travel), motion data, light data, sound data, image data, weather data, temporal data and other data associated with the vehicle 103 and/or the UE 105. Still further, the sensors may detect local or transient network and/or wireless signals, such as those transmitted by nearby devices during navigation of a vehicle along a roadway (Li-Fi, near field communication (NFC), etc. Other examples of sensors of the vehicle 103 and/or the UE 105 may include light sensors, moisture sensors, pressure sensors, audio sensors (e.g., microphone), receivers for different short-range communications (e.g., Bluetooth, Wi-Fi, etc.), etc. In a further example embodiment, sensors about the perimeter of the vehicle 103 and/or the UE 105 may detect the relative distance of the vehicle 103 and/or the UE 105 from a physical object.

It is noted therefore that the above described data may be transmitted via the communication network 119 as sensor data (e.g., including 5G signal data) according to other known wireless communication protocols. For example, each UE 105 may be assigned a unique probe identifier (source ID) for use in reporting or transmitting the sensor data collected by the UEs 105.

In one embodiment, the communication network 119 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G/5G New Radio networks (5G NR), Narrowband Internet-of-Things networks (NB-IoT), code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the data platform 111, UEs 105, applications 107, services platform 121, services 123, and/or content providers 125 communicate with each other and other components of the system 100 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
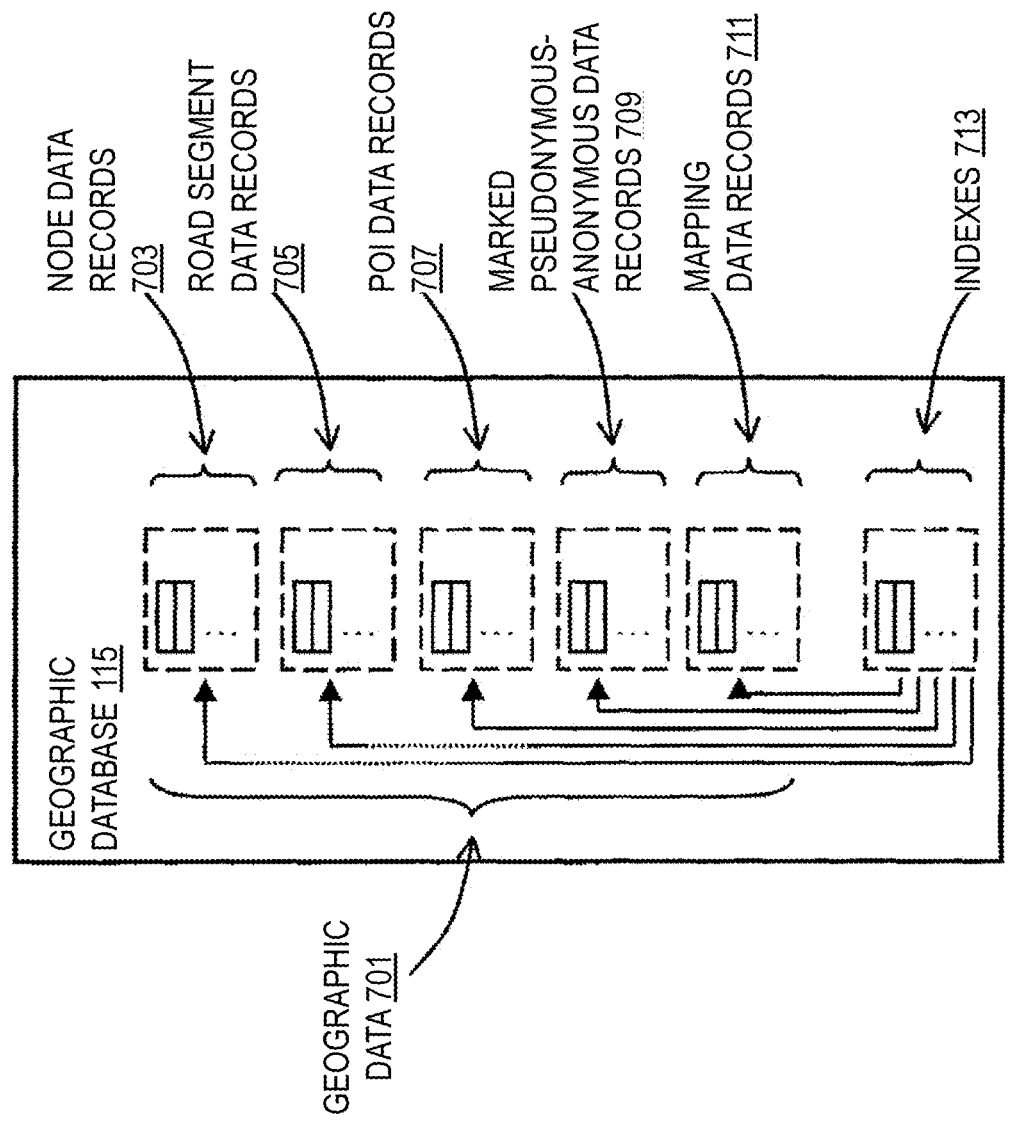
FIG. 7 is a diagram of a geographic database, according to example embodiment(s)

FIG. 7 is a diagram of a geographic database (such as the database 111), according to one embodiment. In one embodiment, the geographic database 115 includes geographic data 701 used for (or configured to be compiled to be used for) mapping and/or navigation-related services, such as for video odometry based on the parametric representation of lanes include, e.g., encoding and/or decoding parametric representations into lane lines. In one embodiment, the geographic database 115 include high resolution or high definition (HD) mapping data that provide centimeter-level or better accuracy of map features. For example, the geographic database 115 can be based on Light Detection and Ranging (LiDAR) or equivalent technology to collect billions of 3D points and model road surfaces and other map features down to the number lanes and their widths. In one embodiment, the mapping data (e.g., mapping data records 711) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 115.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 115 follows certain conventions. For example, links do not cross themselves and do not cross each other except at a node. Also, there are no duplicated shape points, nodes, or links. Two links that connect each other have a common node. In the geographic database 115, overlapping geographic features are represented by overlapping polygons. When polygons overlap, the boundary of one polygon crosses the boundary of the other polygon. In the geographic database 115, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 115 includes node data records 703, road segment or link data records 705, POI data records 707, and marked pseudonymous-anonymous data records 709, mapping data records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 115. In one embodiment, the indexes 713 may be used to quickly locate data without having to search every row in the geographic database 115 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes. The node data records 703 are end points (such as intersections) corresponding to the respective links or segments of the road segment data records 705. The road link data records 705 and the node data records 703 represent a road network, such as used by vehicles, cars, and/or other entities. Alternatively, the geographic database 115 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 115 can include data about the POIs and their respective locations in the POI data records 707. The geographic database 115 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city). In one embodiment, certain attributes, such as lane marking data records, mapping data records and/or other attributes can be features or layers associated with the link-node structure of the database.

In one embodiment, the geographic database 115 can also include the marked pseudonymous-anonymous data records 709 for storing markers, pseudonymous-anonymous data, prediction models, the association between the markers and the marked pseudonymous-anonymous data, annotated observations, computed featured distributions, sampling probabilities, and/or any other data generated or used by the system 100 according to the various embodiments described herein. By way of example, the marked pseudonymous-anonymous data records 709 can be associated with one or more of the node records 703, road segment records 705, and/or POI data records 707 to support localization or visual odometry based on the features stored therein and the corresponding estimated quality of the features. In this way, the marked pseudonymous-anonymous data records 709 can also be associated with or used to classify the characteristics or metadata of the corresponding records 703, 705, and/or 707.

In one embodiment, as discussed above, the mapping data records 711 model road surfaces and other map features to centimeter-level or better accuracy. The mapping data records 711 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the mapping data records 711 are divided into spatial partitions of varying sizes to provide mapping data to UEs 105, vehicles and other end user devices with near real-time speed without overloading the available resources of the vehicles and/or devices (e.g., computational, memory, bandwidth, etc. resources).

In one embodiment, the mapping data records 711 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the mapping data records 711.

In one embodiment, the mapping data records 711 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 115 can be maintained by the content provider 125 in association with the services platform 121 (e.g., a map developer). The map developer can collect geographic data to generate and enhance the geographic database 115. There can be different ways used by the map developer to collect data. These ways can include obtaining data from other sources, such as municipalities or respective geographic authorities. In addition, the map developer can employ field personnel to travel by vehicle (e.g., vehicles 103 and/or UEs 105) along roads throughout the geographic region to observe features and/or record information about them, for example. Also, remote sensing, such as aerial or satellite photography, can be used.

The geographic database 115 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 103 or a UE 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for managing pseudonymous or anonymous user data and relevant data management requests may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
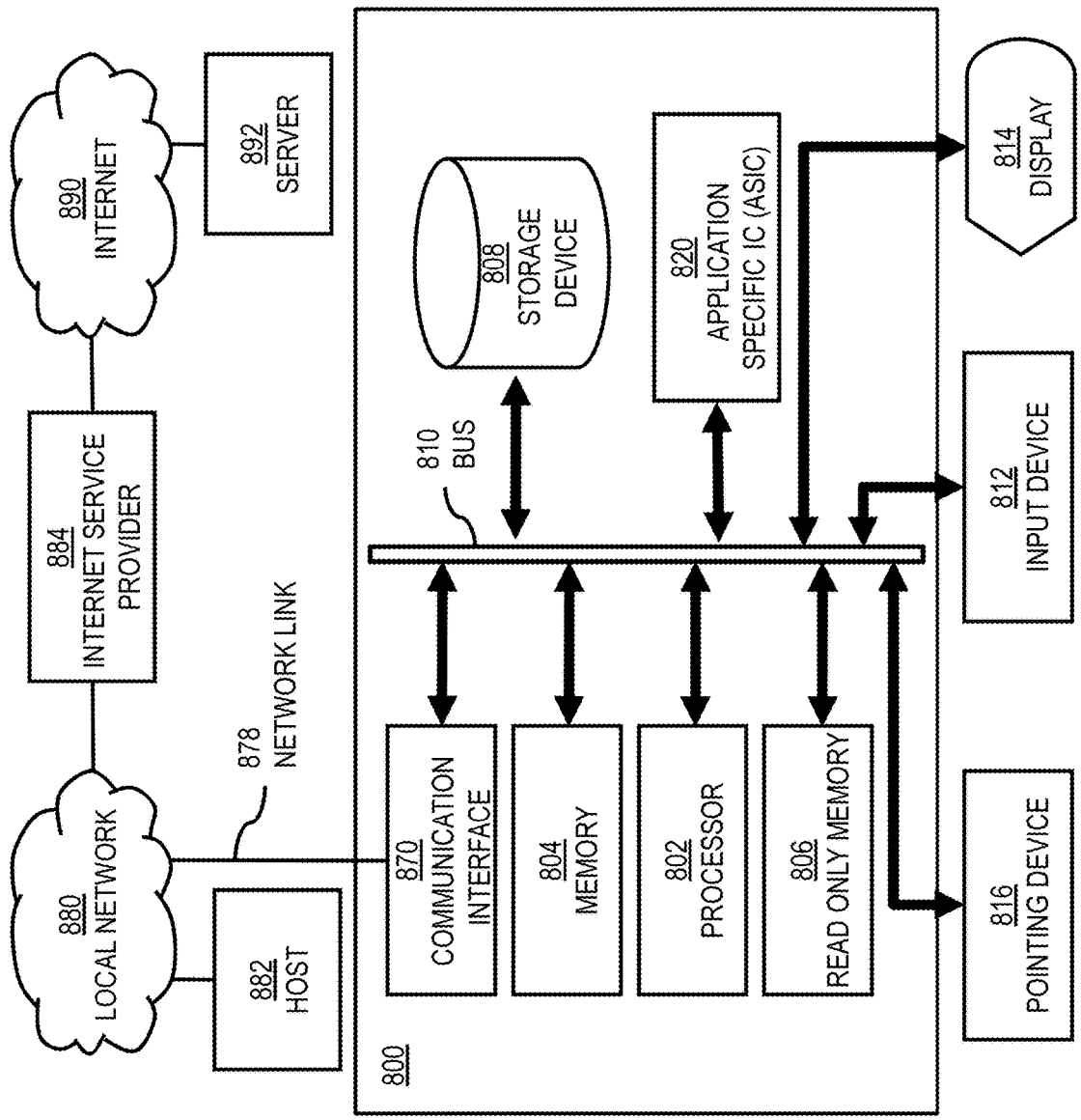
FIG. 8 is a diagram of hardware that can be used to implement example embodiment(s)

FIG. 8 illustrates a computer system 800 upon which an embodiment of the invention may be implemented. Computer system 800 is programmed (e.g., via computer program code or instructions) to manage pseudonymous or anonymous user data and relevant data management requests as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to managing pseudonymous or anonymous user data and relevant data management requests. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for managing pseudonymous or anonymous user data and relevant data management requests. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, which is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, which persists even when the computer system 800 is turned off or otherwise loses power.

Information, including instructions for managing pseudonymous or anonymous user data and relevant data management requests, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, which carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 119 for managing pseudonymous or anonymous user data and relevant data management requests from the UEs 105.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system can be deployed in various configurations within other computer systems, e.g., host 882 and server 892.

FIG. 9 illustrates a chip set 900 upon which an embodiment of the invention may be implemented. Chip set 900 is programmed to manage pseudonymous or anonymous user data and relevant data management requests as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to manage pseudonymous or anonymous user data and relevant data management requests. The memory 905 also stores the data associated with or generated by the execution of the inventive steps.

Figure 10:
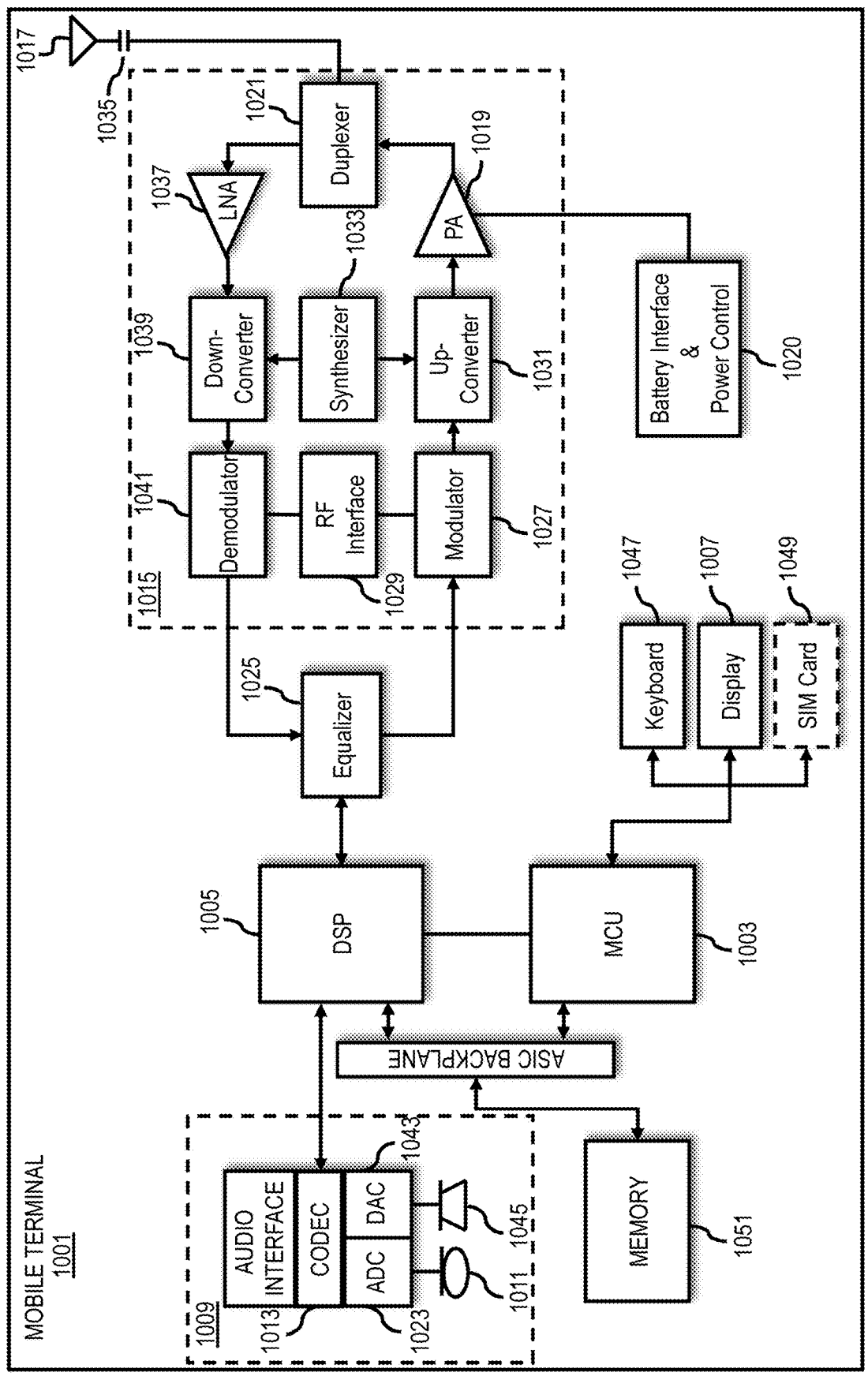
FIG. 10 is a diagram of a mobile terminal (e.g., handset or part thereof) that can be used to implement example embodiment(s).

FIG. 10 is a diagram of exemplary components of a mobile terminal 1001 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to manage pseudonymous or anonymous user data and relevant data management requests. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
   converting at least one numerical feature of a data point into a respective categorical form, wherein each categorical form represents a respective value range into which a numerical value of the respective numerical feature falls,
   determining an identifier of a data contributor associated with the data point;
   concatenating the identifier with the respective categorical form;
   cryptographically hashing the identifier concatenated with the respective categorical form to generate a mark;
   associating the mark with the data point to generate marked pseudonymous-anonymous data; and
   transmitting the pseudonymous-anonymous data to a data platform, wherein the data point is part of a vehicle trajectory data collected by one or more sensors of a vehicle, a device, or a combination thereof, wherein the at least one numerical feature is a time of a data collection of the data point, and wherein in the respective value range is a time window.

2. The method of claim 1, wherein a further numerical feature is a point location associated with the data point, and wherein a further value range is a polygon representing a geographic area.

3. The method of claim 1, wherein the categorical form, the value range, or a combination thereof is predetermined and shared between a data collection device and the data platform associated with collecting and storing the data point.

4. The method of claim 1, further comprising:
   receiving an input specifying a target categorical form associated with a data management request;
   concatenating the identifier with the target categorical form;
   cryptographically hashing the identifier with the target categorical form to generate a request mark; and
   transmitting the data management request with the request mark to the data platform.

5. The method of claim 4, wherein the data platform uses the request mark to query for the pseudonymous-anonymous data that match the data management request.

6. The method of claim 5, wherein the data management request includes an additional constraint parameter, and wherein the data platform uses the additional constraint parameter to further query for the pseudonymous-anonymous data that matches the data management request.

7. The method of claim 6, wherein the additional constraint parameter is a geo-fence.

8. The method of claim 1, wherein the identifier is based on a vehicle identification number associated with a vehicle from which the data point is collected.

9. An apparatus comprising:
   at least one processor; and
   at least one memory including computer program code for one or more programs,
   the at least one memory and the computer program code configured to, with the at least one processor, cause the apparatus to perform at least the following,
      receive pseudonymous-anonymous data, wherein the pseudonymous-anonymous data comprises a data point associated with a mark, and wherein the mark is a cryptographic hash of (1) an identifier of a data contributor of the datapoint and (2) a respective categorical form of at least one numerical feature of the data point;
      store the pseudonymous-anonymous data in an electronic database; and
      performing a data management function on the pseudonymous-anonymous data based on the mark, wherein the data point is a part of vehicle trajectory data collected by one or more sensors of a vehicle, a device, or a combination thereof, wherein the at least one numerical feature is a time of a data collection of the data point, and wherein the respective categorical form is a time window for binning the time of the data collection.

10. The apparatus of claim 9, wherein a further numerical feature is a point location associated with the data point, and wherein a further respective categorical form is a polygon representing a geographic area for binning the point location.

11. The apparatus of claim 9, wherein the apparatus is further caused to:
receive a data management request specifying a request mark, wherein the request mark is a cryptographic hash of (1) the identifier of the data contributor, and (2) a target categorical form for selecting the pseudonymous-anonymous data that is a target of the data management request;
query the pseudonymous-anonymous data associated with a respective mark that matches the request mark; and
perform the data management request on the matching pseudonymous-anonymous data.

12. The apparatus of claim 11, wherein the data management request includes an additional constraint parameter, and wherein the apparatus is further caused to:
use the additional constraint parameter to further query for the pseudonymous-anonymous data that match the data management request.

13. A non-transitory computer-readable storage medium, carrying one or more sequences of one or more instructions which, when executed by one or more processors, cause an apparatus to at least perform the following steps:
converting at least one numerical feature of a data point into a respective categorical form, wherein each categorical form represents a respective value range into which a numerical value of the respective numerical feature falls, determining an identifier of a data contributor associated with the data point;
concatenating the identifier with the respective categorical form;
cryptographically hashing the identifier concatenated with the respective categorical form to generate a mark;
associating the mark with the data point to generate marked pseudonymous-anonymous data; and
transmitting the pseudonymous-anonymous data to a data platform, wherein the data point is part of vehicle trajectory data collected by one or more sensors of a vehicle, a device, or a combination thereof, wherein the at least one numerical feature is a time of data collection of the data point, and wherein the respective value range is a time window.

14. The non-transitory computer-readable storage medium of claim 13, wherein a further numerical feature is a point location associated with the data point, and wherein a further respective value range is a polygon representing a geographic area.

15. The non-transitory computer-readable storage medium of claim 13, wherein the apparatus is caused to further perform:
receiving an input specifying a target categorical form associated with a data management request;
concatenating the identifier with the target categorical form;
cryptographically hashing the identifier with the target categorical form to generate a request mark; and
transmitting the data management request with the request mark to the data platform.

16. The non-transitory computer-readable storage medium of claim 15, wherein the data platform uses the request mark to query for the pseudonymous-anonymous data that match the data management request.

* * * * *